(12) United States Patent
Reagor

(10) Patent No.: US 8,577,330 B2
(45) Date of Patent: Nov. 5, 2013

(54) PREDICTION OF MOBILE BANDWIDTH AND USAGE REQUIREMENTS

(75) Inventor: Cameron Paul Reagor, Brady, MT (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/124,745

(22) PCT Filed: Sep. 14, 2010

(86) PCT No.: PCT/US2010/048713
§ 371 (c)(1),
(2), (4) Date: Apr. 18, 2011

(87) PCT Pub. No.: WO2012/036672
PCT Pub. Date: Mar. 22, 2012

(65) Prior Publication Data
US 2012/0064893 A1    Mar. 15, 2012

(51) Int. Cl.
*H04M 11/00* (2006.01)
*H04W 72/00* (2009.01)
(52) U.S. Cl.
USPC .......................................... 455/405; 455/450
(58) Field of Classification Search
USPC .................................................. 455/405, 450
See application file for complete search history.

(56) References Cited

U.S. PATENT DOCUMENTS

| | | | |
|---|---|---|---|
| 6,850,764 B1 * | 2/2005 | Patel .............................. | 455/450 |
| 2002/0041575 A1 * | 4/2002 | Karabinis et al. ............. | 370/319 |
| 2004/0198331 A1 * | 10/2004 | Coward et al. ............. | 455/414.1 |

OTHER PUBLICATIONS

Dahlhaus R., "Fitting Time Series Models to Non-stationary Processes", The Annals of Statistics, Feb. 1997, vol. 25 No. 1, pp. 1-37.
"The future of mobile" as accessed on the internet at http://googleblog.blogspot.com/2008/09/future-of-mobile.html.
Goldman, David, "AT&T: The most hated company in iPhone land," as accessed on the internet at http://money.cnn.com/2009/12/29/technology/att/.
Schatz, Amy, "FCC Considers Shifting Some TV Airwaves to Broadband," as accessed on the internet at http://online.wsj.com/article/SB10001424052748703574604574499730302393274.html.
"Gartner Identifies the Top 10 Consumer Mobile Applications for 2012," as accessed online at http://www.gartner.com/it/page.jsp?id=1230413.
"Google Announces Fourth Quarter and Fiscal Year 2009 Results," as accessed online at http://investor.google.com/releases/2009Q4_google_earnings.html.
Charls, R. N. and Heejoon, K., "Spurious periodicity in inappropriately Detrended Time Series", Econometrica, vol. 49, Issue 3, pp. 741-751, May 1981.

(Continued)

*Primary Examiner* — Temica M Beamer
*Assistant Examiner* — Joel Ajayi
(74) *Attorney, Agent, or Firm* — Maschoff Brennan

(57) ABSTRACT

Techniques for determining data requirements for cellular phone use within one or more cells of a cellular network. A central processing repository receives user information identifying a cellular phone user within a cell of the network. In response, the central processing repository accesses usage profile information. The usage profile information specifies historical data usage in the cell for a given location and time. The central processing repository determines, based on the usage profile information, a current mode of operation and a probability that the current mode of operation will change. The central processing repository provides the current mode of operation and probability of mode change to a cell tower of the cell.

32 Claims, 8 Drawing Sheets

(56) References Cited

OTHER PUBLICATIONS

2008 Pew Internet & American Life/Elon University Predictions Survey, Scenario One, The Evolution of Mobile Internet Communications, http://www.elon.edu/e-web/predictions/expertsurveys/2008survey/mobile_internet_2020.xhtml.

Monreale et al., "WhereNext: a location predictor on trajectory pattern mining," Proceedings of the 15th ACM SIGKDD International Conference on Knowledge discovery and data mining, Paris France, 2009, pp. 637-646.

N Hristova & GMP O'Hare, "Ad-me: Wireless Advertising Adapted to the User Location, Device and Emotions," Proceedings of the 37th Annual Hawaii International Conference on System Sciences—Track 9, Jan. 5- Jan. 8, 2004, pp. 10.

Kawamoto, D., "Study tracking people via cell phone raises privacy issues," accessed at http://news.cnet.com/8301-10784_3-9960687-7.html, last modified on Jun. 5, 2008.

International Search Report dated Nov. 3, 2010.

Akyildiz, I. F. et al., "The Predictive User Mobility Profile Framework for Wireless Multimedia Networks", IEEE/ACM Transactions on Networking, Dec. 2004, pp. 1021-1035, vol. 12, No. 6.

Lee D.S. et al., "Bandwidth-Reservation Scheme Based on Road Information for Next-Generation Cellular Networks", IEEE Transactions on Vehicular Technology, Jan. 2004, pp. 243-252, vol. 53, No. 1.

\* cited by examiner

| Current Mode | Mode Change Probability | Probable Next Mode | Location | Velocity | Geographic Hotspot |
|---|---|---|---|---|---|
| | | | | | |

500

502
Receive User Information Identifying A Cellular Phone User Within A Cell Of A Cellular Network

504
Access Usage Profile Information That Specifies Historical Data Usage Within A Cell For A Given Location And Time

506
Determine A Current Mode Of Operation For The Cellular Phone And A Probability Of When The Current Mode Of Operation Will Change

508
Provide The Current Mode Of Operation And The Probability Of When The Current Mode Of Operation Will Change To A Cell Tower

*Figure 5*

PREDICTION OF MOBILE BANDWIDTH AND USAGE REQUIREMENTS

BACKGROUND

The mobile, or cellular, communication system is in the process of replacing many traditional industries and communication systems. This is a result of the technological advances in computational miniaturization that have led to handheld cellular devices that far exceed the capabilities of the personal computer of a few years ago. As handheld cellular devices replace the personal computer, the wired telephone, the digital assistant, and an a host of other existing consumer electronic devices, the data demands on existing and future cellular networks will be extensive. This has resulted in deficiencies in current systems for managing the limited bandwidth resources of cellular networks.

SUMMARY

An illustrative embodiment disclosed herein relates to a method for a central processing repository to determine data requirements for cellular phone use within one or more cells of a cellular network. The central processing repository receives information identifying a cellular phone user within a cell of the network. In response, the central processing repository accesses usage profile information. The usage profile information specifies historical data usage in the cell for a given location and time. The central processing repository determines, based on the usage profile information, a current mode of operation and a probability that the current mode of operation will change. The central processing repository provides the current mode of operation and probability of mode change to a cell tower of the cell.

An illustrative embodiment disclosed herein relates to a cellular network that includes a cell including at least one cell tower and a central processing repository computing system communicatively coupled to the cell tower. The central processing repository computing system includes a database that stores usage profile information. The usage profile information specifies historical data usage in the cell for a given location and time. The central processing repository computing system uses the usage profile information to determine a current mode of operation for a cellular phone user and a probability that the current mode of operation will change and to provide this information to the cell tower for use in managing predicted bandwidth resource needs.

An illustrative embodiment disclosed herein relates to a method for a cell tower of a cell in a cellular network to manage bandwidth resources for cellular phone users in the cell. The cell tower receives information from a central processing repository indicating a current mode of operation of a cellular phone user and a probability that the current mode of operation will change to a second mode of operation. The cell tower approximates the likely location and data usage needs of the cellular phone user if the current mode of operation is maintained and approximates the likely location and data usage needs of the cellular phone user if the current mode of operation changes. The cell tower allocates bandwidth resources based on the likely location and data usage needs of the cellular phone user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 5 is a flow diagram of an illustrative embodiment of a method for determining data requirements for cellular phone use in a cell of the cellular network.

DETAILED DESCRIPTION

Figure 1:
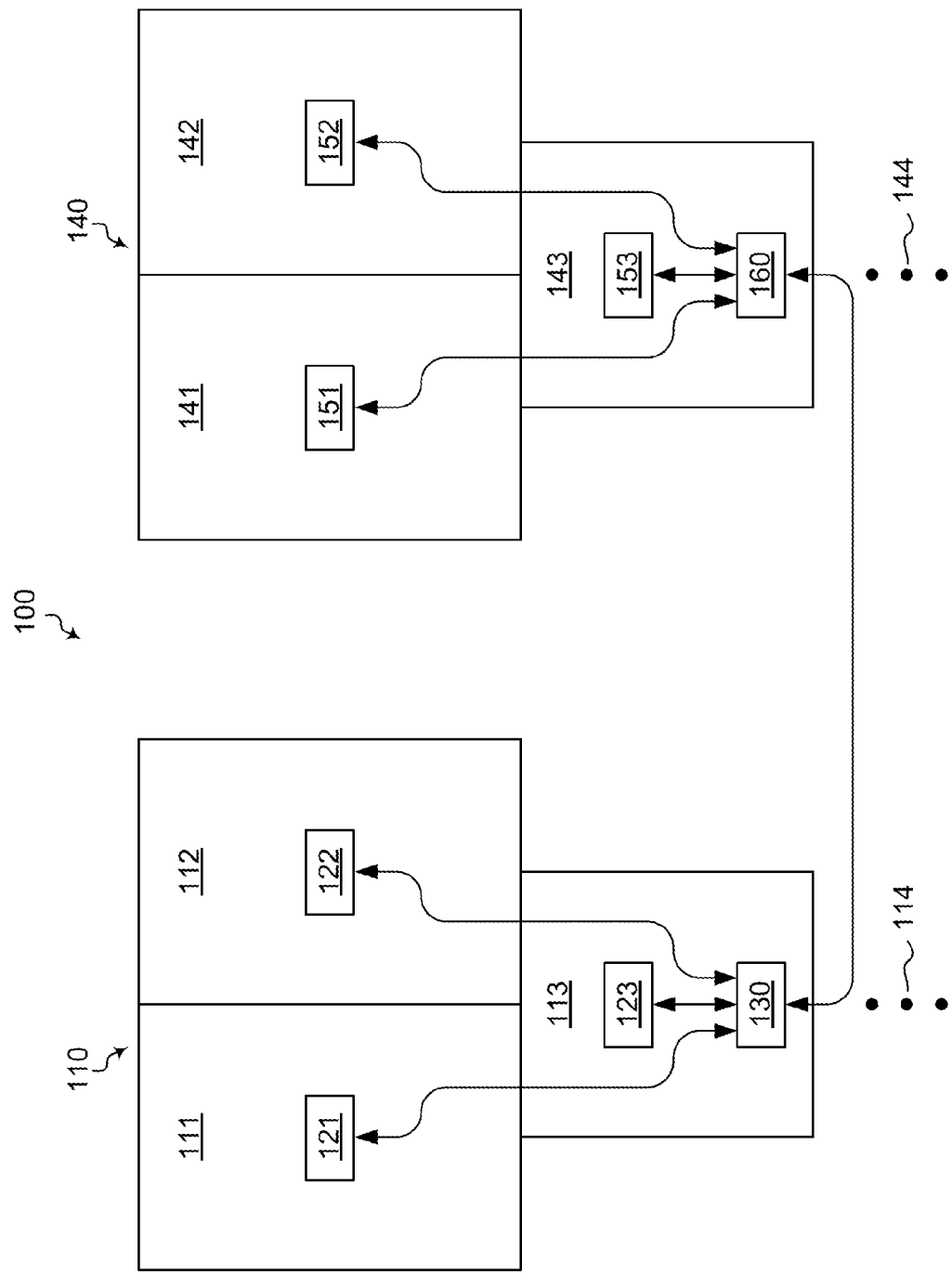
FIG. 1 is a schematic of an illustrative embodiment of an environment for performing statistical predictions of bandwidth usage in a cell of a cellular network.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Embodiments disclosed herein relate to communications systems that include cells of a cellular network. The term "cellular network" is defined to mean any communications network distributed over land areas called cells, each being served by at least one fixed-location transceiver, such as a cell tower or base station. A cellular network may also be other types of wireless communication systems.

The cellular network includes a central processing repository that determines data usage requirements for a cellular phone user. The term "data" is used herein to mean both voice data, such as that received during a phone call, and non-voice data, such as data received from the Internet. The term "cellular phone" is defined to mean any type of mobile device that is capable of receiving voice data and/or non-voice data. Accordingly, a cellular phone may be a traditional cellular phone or other mobile phone of any type of communication protocol or another computing device that is capable of receiving non-voice data such as a mobile computer, PDA, or the like, but is not required to have conventional voice data capabilities. The term "user" is defined to include both human users of a cellular phone and a non-human user, such as a computer, that intelligently communicates over a cellular network.

The central computing repository includes a database of historical usage profile information of users in the various cells of the cellular network. The usage profile information defines data usage tiers, user classifications, and user modes of operation that each help to define the historical data usage of the user at a given time and location in the cell.

The central computing repository receives user information from a cell tower of a cell that identifies the user and also specifies the user's location and velocity (speed and direction of travel) within the cell. The user information may also specify the user's current data usage.

The central processing repository uses the usage profile information for the user to determine a current mode of operation based on the user's current location and velocity in the cell. The central processing repository also determines a probability that the mode of operation will change and the probable new mode of operation given the location and velocity.

The central processing repository provides the current mode of operation, the probability of mode change, and the probable new mode of operation to the cell tower. The cell tower is then able to use this information to determine current and predicted future bandwidth needs of user while in the cell and then allocate the bandwidth resources of the cell in a more efficient manner.

The usage profile information is continually updated as the user's data usage patterns change. In addition, any time the cell tower determines that the user's data usage has gone beyond the parameters of the current mode of operation and/or the probable future mode of operation, the central processing repository can update the current mode of operation, the probability of mode change, and the probable new mode of operation and provide the updated information to the cell tower. The cell tower may then update its current and predicted bandwidth allocations. In this manner, the cell tower is able to continually update its allocation of bandwidth as needed.

Embodiments disclosed herein advantageously provide a mechanism for predicting cell bandwidth usage without the need for large computations at the cell towers. Instead, the majority of the computation is performed at the central processing repository, which leaves processing resources of the cell towers for other needed purposes. In addition, the information sent between the central processing repository and the cell tower may be sent in a few bytes of data, which saves on bandwidth in the cell. Further, since the bandwidth prediction is updated continuously, any user behavior that falls outside of the historical data is easily accounted for.

Several illustrative embodiments of respective aspects of the present disclosure are given below by way of example with reference to the accompanying figures. FIG. 1 is a schematic of an illustrative embodiment of an environment 100 for performing statistical predictions of bandwidth usage in a cell of a cellular network. The environment 100 includes a cellular network 110, a central processing repository 130 associated with the cellular network 110, a second cellular network 140 and a second central processing repository 160 associated with the second cellular network 140.

In an illustrative embodiment, the cellular network 110 includes a number of cells 111, 112, and 113. The ellipses 114 shown in FIG. 1 illustrate that the cellular network 110 may have any number of additional cells as needed. It will be understood that the cells 111, 112, and 113 may be any suitable shape and need not be rectangular as shown in FIG. 1.

The cells 111, 112, and 113 include respective cell towers 121, 122, and 123. The cell towers 121, 122, and 123 are used to direct or process communication for a cellular phone that is within the corresponding cell. As will be explained in more detail to follow, the cell towers 121, 122, and 123 may provide the central processing repository 130 with user information that identifies a user within their respective cells. Although not illustrated, any cells 114 also include a cell tower. The cells towers 121, 122, and 123 may be placed in any suitable location within their respective cells.

The cellular network 110 is associated with the central processing repository 130. As shown in FIG. 1, the central processing repository 130 is in communication with the cell towers 121, 122, 123 and with any cell towers of the cells 114. The central processing repository 130 may provide a usage profile that specifies a current mode of operation for the cellular phone user and a probability that the current mode of operation will change to the cell towers 121, 122, and 123 as will be described in more detail to follow. As used herein, the term "probability" as used in connection with a mode change, can include the probability of a mode change within a specified period of time.

Although FIG. 1 shows that the central processing repository 130 is located within cell 113, this need not be the case. In some embodiments, the central processing repository 130 may be located in other cells of the cellular network 110, such as cells 111 and 112. In other embodiments, the central processing repository may be located in a location that is not part of the cellular network 110.

Although not illustrated, in one illustrative embodiment, each of the cells of the cellular network 110 may have their own central processing repository. However, the central processing repository 130 is typically associated with between 200 and 300 cells, although a different number of cells are also contemplated by the embodiments disclosed herein. Accordingly, in embodiments where the cellular network 110 includes more than 200 to 300 cells, the cellular network 110 may be associated with additional central processing repositories.

FIG. 1 further illustrates the second cellular network 140, which may be in a different location than the cellular network 110. In one illustrative embodiment, the cellular network 110 may be located in a first city and the second cellular network 140 may be located in a second city.

The second cellular network 140 includes a number of cells 141, 142, and 143. The ellipses 144 shown in FIG. 1 illustrate that the second cellular network 140 may have any number of additional cells as needed. The cells 141, 142, and 143 include respective cell towers 151, 152, and 153. The cell towers 151, 152, and 153 are used to direct or process communication for a cellular phone that is within the corresponding cell. The cell towers 151, 152, and 153 may also provide user information to the second central processing repository 160 that is associated with the second cellular network 140.

As shown in FIG. 1, the second central processing repository 160 is in communication with the cell towers 151, 152, 153 and with any cell towers of the cells 144. The second central processing repository 160 may provide a usage profile that specifies a current mode of operation for the cellular phone user and a probability that the current mode of operation will change to the cell towers 151, 152, and 153.

FIG. 1 also shows that the central processing repository 130 and the second central processing repository 160 are in communication with one another. This communication may be accomplished through any network that is compatible with the central processing repositories. Examples of such a network include, by way of example, satellite networks, 802.11 networks, computer networks (e.g., LAN, WAN), wireless networks (e.g., Bluetooth, WiFi), cellular networks, telephony networks (e.g., landline or PSTN), data networks, the Internet, or the like or any combination thereof. This communication allows the central processing repository 130 and the second central processing repository 160 to share usage profile information across cellular networks. In this way, usage profile information about a user who typically uses cellular network 110 will be available to second cellular network 140 should the user use the second cellular network 140 at some point in time.

Figure 2A:
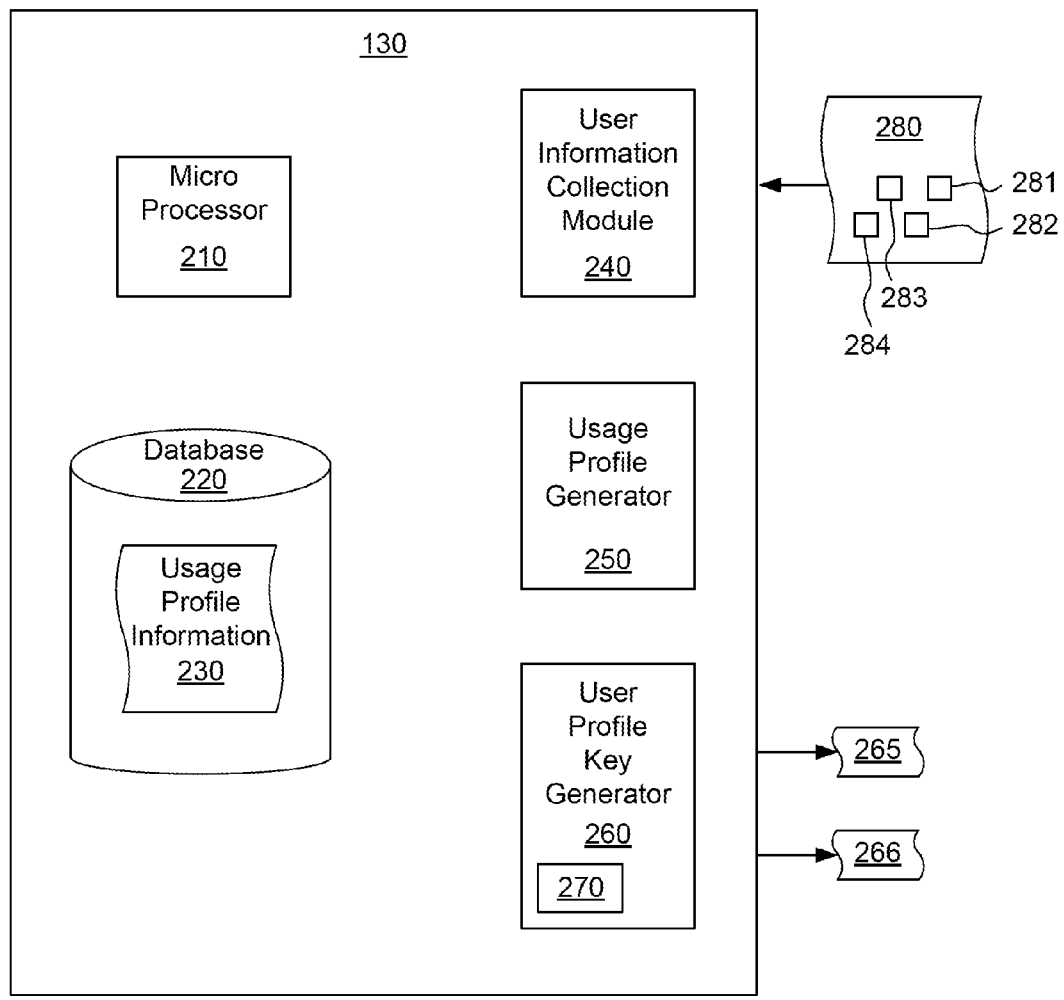
FIG. 2A is an illustrative embodiment of a central processing repository of FIG. 1.

FIG. 2A illustrates an illustrative embodiment of the central processing repository 130. As shown, the central processing repository 130 includes various operational modules and databases that will be explained in more detail. Although not necessarily shown as being coupled, so as to not distract from the embodiments disclosed herein, it will be understood that the various operational modules and databases of the central processing repository 130 may be coupled to each other by any reasonable means, such as a computer bus, other wiring, or wireless connection as circumstances warrant. In addition, although the various modules and databases of the central processing repository 130 are shown as being separate, this need not be the case. In some illustrative embodiments, the one or more modules or databases may be included within another module or database. The description of the central processing repository 130 may also correspond to the second central processing repository 160.

As shown, the central processing repository 130 includes a processor 210. The processor 210 may be any reasonable processor and in operation allows the central processing repository 130 to perform various operations related to determining the data requirements for cellular phone usage in a cell. In some embodiments, the processor 210 may be accessed by the various operational modules of the central processing repository 130 to provide the modules processing resources. In other embodiments, the operational modules may have access to alternative processing resources.

The central processing repository 130 also includes a database or memory 220. The database 220 may be implemented in any type of reasonable non-volatile or volatile memory. In one illustrative embodiment, the database 220 can be used to store usage profile information 230. Although the database 220 is shown as being included within the central processing repository 130, in some embodiments the database 220 may be external to the central processing repository 130 while being accessible to the central processing repository 130.

A user information collection module 240 is included in the central processing repository 130. In operation, the user information collection module 240 receives user information 280 from the cell towers 121, 122, and 123 for cellular phone users that are in their respective cells. The user information 280 may include different types of information. In one embodiment, the user information 280 may include user identification information 281, which is used to identity a specific user who enters a cell. For example, in one illustrative embodiment, the user identification information 281 is based on the International Mobile Subscriber Identity (IMSI) standard used in most mobile or cellular phones. Thus, the user identification information 281 allows an individual user to be identified.

The user information 280 may also include a location 282 and a velocity 283 of the user within the cell. For example, when a user enters a cell, such as cell 111, his or her location 282 within the cell and the velocity 283, which is the speed and direction of the user as he or she travels through the cell, may be determined by a cell tower such as cell tower 121 and then provided to the central processing repository 130.

In some embodiments, the user information 280 may also include data usage information 284. The data usage information 284 may specify what type and how much data the user accesses at a given location and time in the cell. The usage information 284 is useful during an initialization process for the central processing repository 130 to create the usage profile information 230, as will be explained in further detail to follow.

The usage data collection module 240 may provide the user information 280 to a usage profile generator 250. During the initialization process, the usage profile generator 250 creates the usage profile information 230 for each user of a cell. At a later time after the usage profile information 230 has been generated, the usage profile generator 250 may update the usage profile information 230 as will be explained. Thus, the usage profile information 230 acts as a usage history for each user in the cell. The usage profile generator 250 then stores the usage profile information 230 in the database 220. In one illustrative embodiment, the usage profile information 230 is generated in table form by the usage profile generator 250. In other embodiments, the usage profile information 230 may be in other formats as needed.

Figures 2B, 2C:
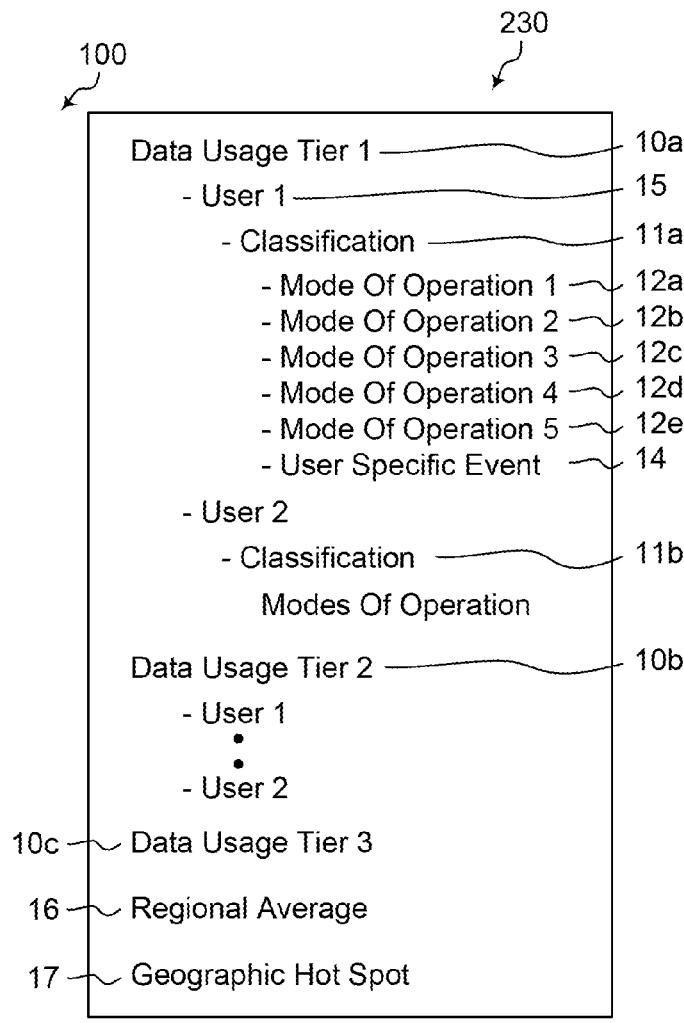
FIG. 2B is an illustrative embodiment of usage profile information table.
FIG. 2C is an illustrative embodiment of a profile key.

In one illustrative embodiment as illustrated in FIG. 2B, the usage profile information 230 is divided into various data usage tiers. For example, a first data usage tier 10a may correspond to high data usage, a second data usage tier 10b to medium data usage, and a third data usage tier 10c to low data usage, although more than three data tiers may exist. As explained previously, data is defined to mean both voice information and non-voice information that is received by a cellular or mobile phone. Thus, a user 15 in the high data usage tier may access a relatively large amount data.

Alternatively, the data usage tiers may correspond to the type of device that is being used. For example, a first data usage tier 10a may correspond to a smart phone tier. Since smart phones allow the use of both voice data and/or non-voice data, a user placed in the smart phone data usage tier would be a user who accesses both types of data. A second data usage tier 10b may correspond to a voice-only tier, and covers users who use voice-only devices.

Within each data tier, the various users may be given a classification 11a or 11b that distinguishes different types of users. For example, in one embodiment, the classifications 11a or 11b may be streamer, heavy, medium, average, light, voice or emergency. For instance, a specific user 15 in the heavy data usage tier may be classified as average since the user accessed an amount of data that is average for the data tier. If the specific user 15 used more than the average data, he or she might be classified as medium, heavy, or streamer. Likewise, if the user 15 used less data than average or perhaps only accessed voice data, he or she might be classified as light or voice. The emergency classification would typically be assigned to a user 15 who only used his or her cellular phone during an emergency.

Not all classifications map equally as well to each data usage tier. For example, an emergency classification would rarely be found in a high data usage tier or in a smart phone tier. In addition, other classifications than those mentioned may also be used as needed. For example, any significant cluster of user types may become a classification. Statistical significance and the total number of classes are the only constraints on the creation of a user class. In some embodiments, the various users of the cell are given a classification without first being divided into data usage tiers.

Each user 15, regardless of how classified, is also assigned various modes of operation based on time and location of data usage in a cell. For example, suppose a user 15 were classified as a streamer in a smart phone tier. This user 15 would still have various operational modes at different times and locations within the cell. In this example, there is a first mode of operation 12*a*, in which he or she actively downloads data, such as a podcast. There is a second mode of operation 12*b*, in which the user has a burst of activity, such as sending and receiving an email. A third mode of operation 12*c* may be a navigation mode, in which the user navigates the internet or some other database. A fourth mode of operation 12*d* may be an intermittent mode, in which the user sporadically uses his or her cellular phone. A fifth mode of operation 12*e* may be a background or idle mode, in which the user's cellular phone is turned on, but is not being used. It will be appreciated that other modes of operation may be defined.

In some illustrative embodiments, the usage profile information 230 may not include any historical usage information for a user who enters a cell for the first time. Accordingly, the usage profile information 230 may include regional average usage data 16 that specifies a typical amount of data that users in a particular cell use at a given location and time. The regional average usage data 16 may then be used for the user until a usage history for the user is established.

In other embodiments, the user may not have entered previously into a particular cell such as cell 111, but may have entered previously into an adjacent cell, such as cell 112. In such case, the central processing repository 130 may include usage profile information for the adjacent cell. This usage profile information may be used for the user until a usage history for the user is established for the particular cell.

In some illustrative embodiments, some cells may include geographic hotspots where data usage is increased. For example, a cell such as cell 111 may include a tourist attraction where numerous users are located who access large amounts of data at any given time. Alternatively, the cell may include an unusual geological feature that is not commonly known and that prompts users to request data explaining the geological feature. In either case, the amount of data usage at that particular location in the cell is expected to increase. In such embodiments, the usage profile information 230 may include information 17 that specifies the location of the geographic hotspots.

In some illustrative embodiments, a specific user 15 who enters a cell may exhibit user specific activities or events. For example, a user may make a right-hand turn while driving home from work at the same location and time on every work day or the user may stop at a particular location on a regular basis. Information 14 about such user specific events may be included in the usage profile information 230.

Accordingly, regardless of how it is formatted, the usage profile information 230 includes historical information about the data usage of user for a given location and time in a cell. As mentioned, the user information 280, specifically user identification information 281, is used specify the user and to map the historical data to the specific user. Further, the usage profile information 230 may be organized into data usage tiers, user classifications, and modes of operation that quantify the historical usage patterns of the user. This information, along with any geographic hotspot information, may be used to help determine a user's expected data usage in a cell as will be explained.

Returning to FIG. 2A, the central processing repository 130 also includes a user profile key generator 260. In operation, the user profile key generator 260 receives the user information 280 from the user information collection module 240. Using this information, the user profile key generator 260 accesses the usage profile information 230 in the database 220 for the user identified in the user information 280. A statistical module 270 of the user profile key generator 260 then performs statistical best fit analysis on the usage profile information 230 to determines the current mode of operation for a user based on the user's location and velocity upon entering the cell and the user's current data use. The current mode of operation may also include the data usage tier, and the classification previously discussed. As mentioned, the current mode of operation specifies the expected data usage, both voice and non-voice, of the user based on the historical data usage at the location and time.

The statistical module 270 may also perform analysis to determine a mode of operation change probability and to determine what the most likely next mode of operation at a given location and time in the cell. For example, suppose it was determined that the current mode of operation was intermittent when the user entered the cell. Further suppose that the usage profile information 230 for the user indicated that the user regularly accessed a podcast at a certain location and time in the cell. Using this information, the statistical module 270 would determine that there was a high probability that the mode of operation would change at the location and that the next likely mode of operation would be the streaming mode of operation.

In those embodiments where the user is entering the cell for the first time, the current mode of operation may be based on the regional average usage data 16 or on the user's usage history in an adjacent cell. In addition, the probability of mode change and the probable next mode of operation may also be based on the regional average usage data 16 or the user's usage history in an adjacent cell.

Once the current mode of operation, the probability of change, and the probable next mode have been determined, the user profile key generator 260 generates a profile key 265 that includes this information as well as the location and velocity information received from the cell tower. An example of the profile key 265 is shown in FIG. 2C. In those embodiments where the cell includes a geographic hotspot, this information may also be included in the profile key 265. The central processing repository 130 may then provide the profile key 265 to the cell tower as will be explained in more detail to follow. It will be understood that in some embodiments, the profile key 265 need not include all the information shown in FIG. 2C or it may include more information.

As mentioned previously, in some embodiments the usage information 230 may include user specific information that may influence the user's data use. In such embodiments, the user specific information may be included in the profile key 265. Alternatively, the user profile key generator 260 may generate a secondary profile key 266 that includes the user specific event and the location of probable mode change. The secondary profile key 266 may be sent to the cell tower as well.

Figure 3:
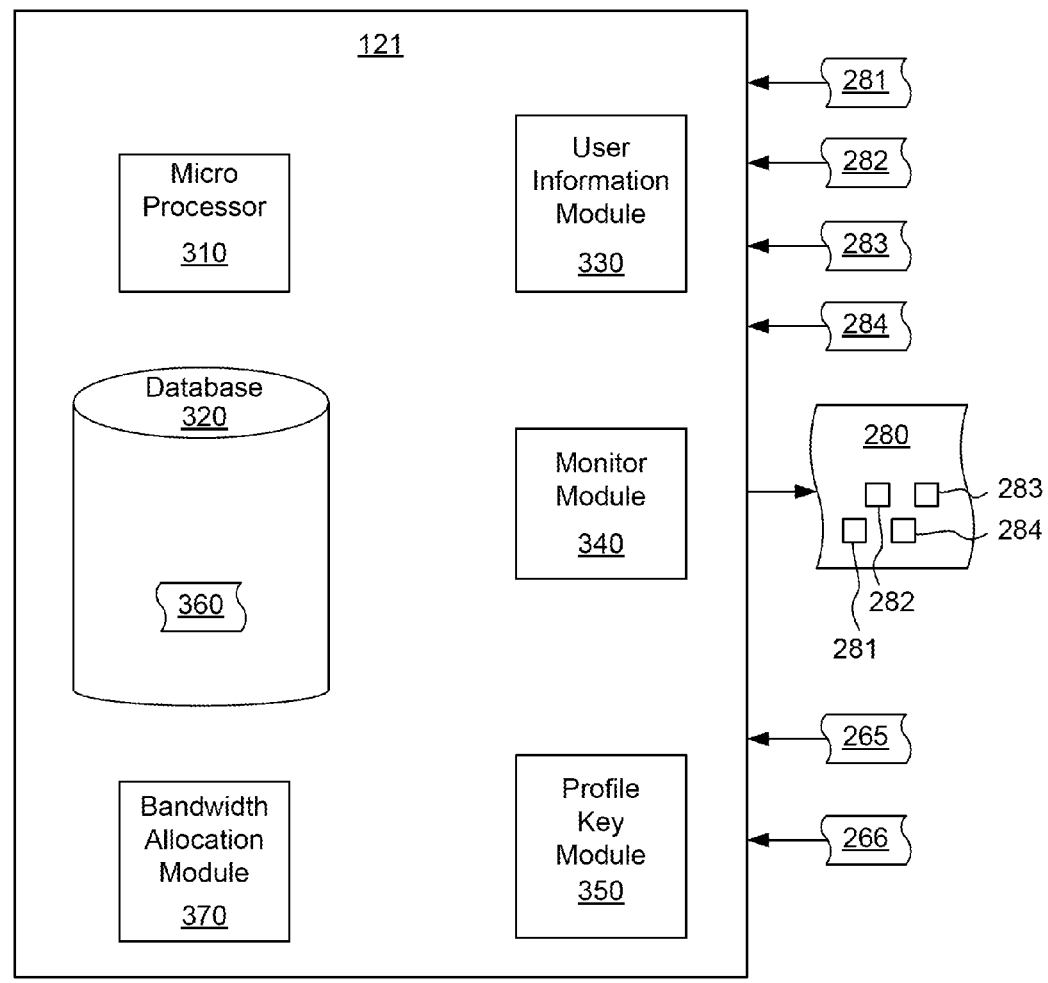
FIG. 3 is an illustrative embodiment of a cell tower of FIG. 1.

FIG. 3 illustrates an illustrative embodiment of the cell tower 121, which includes various operational modules and databases that will be explained in more detail. Although not necessarily shown as being coupled, so as to not distract from the embodiments disclosed herein, it will be understood that the various operational modules and databases of the cell tower 121 may be coupled to each other by any reasonable means such as a computer bus, other wiring, or wireless connection as circumstances warrant. In addition, it will be understood that although the various modules and databases of the cell tower 121 are shown as being separate, this need not be the case. In some illustrative embodiments, the one or more modules or databases may be included within another module or database. It will also be understood that the description of the cell tower 121 may correspond to the cell towers 122 and 123.

As shown, the cell tower 121 includes a processor 310, which may be any reasonable processor and, in operation, allows the cell tower 121 to perform various operations related to determining the data requirements for cellular phone usage in a cell. In some embodiments, the processor 310 may be accessed by the various operational modules of the cell tower 121 to provide the modules processing resources. In other embodiments, the operational modules may have access to alternative processing resources.

The cell tower 121 also includes a database or memory 320. The database 320 may be implemented in any type of reasonable non-volatile or volatile memory. In one illustrative embodiment, the database 320 can be used to store information related to data usage in the cell 111. Although the database 320 is shown as being included within the cell tower 121, in some embodiments the database 320 may be external to the central cell tower 121 while being accessible to the cell tower 121.

The cell tower includes a user information module 330. In operation, the user information module receives or accesses the user identification information 281 from a cellular phone that has entered cell 111. As previously described, the user identification information 281 is used to identify the user and may correspond to the IMSI of the cellular phone. The user information module 330 may also determine the location 282 and the velocity 283 of the user as he or she enters cell 111. As previously described, the velocity 283 includes the speed and direction of the user as he or she crosses the cell 111.

A monitor module 340 is included in the cell tower 121. The monitor module 340 monitors the data usage 284 of the user when he or she enters cell 111. This information is then provided to the user information module 330.

The user information module 330 then generates user information 280, which includes the user identification information 281, the location 282 of the user in the cell, the velocity 283 of the user in the cell, and the data usage 284 of the user. The user information 280 is then provided to the central processing repository 130, where it is used to generate the usage profile information 230 and the profile keys 265 and 266 as previously described.

The cell tower 121 further includes a profile key module 350, which receives the profile key 265 and, in some embodiments, profile key 266 from the central processing repository 130. As described, the profile key 265 typically includes information that specifies the user's current mode of operation, a probability of a mode change, the probable next mode, and the location and velocity of the user. The profile key 265 may also include geographic hotspot information.

In some embodiments, the profile key module 350 then accesses operational mode tables 360 that are stored in database 320. The modes of operational mode tables 360 correspond to the modes of operation included in the usage profile information 230 and are provided to the cell tower 121 by the central processing repository 130. In some embodiments, the modes of operational mode tables 360 are updated during times of slow network usage, such as overnight.

The profile key module 350 maps the current mode of operation information in the profile key 265 with the modes of operational mode tables 360 to specify the current mode of operation of the user. As explained, the current mode of operation specifies the current amount data usage of the user.

The current mode of operation as well as the other information from the profile keys 265 and 266 is provided to a bandwidth allocation module 370. The bandwidth allocation module 370 uses the current mode of operation to approximate the likely current location of the user in the cell and how much data bandwidth the user currently needs. The bandwidth allocation module 370 is then able to allocate the needed bandwidth resources, which include communication channel and beam, and to ensure that the cell tower's antenna is oriented in the most efficient manner to meet the bandwidth needs of the user.

In addition, the bandwidth allocation module 370 uses the information from the profile keys 265 and 266 as well as from the modes of operational mode tables 360 to approximate the likely location and data usage needs of the user when the there is a mode of operation change. This allows the bandwidth allocation module 370 to anticipate the bandwidth needs of the user should the mode of operation change.

In one illustrative embodiment, the bandwidth allocation module 370 uses the information from the profile keys 265 and 266, as well as from the modes of operational mode tables 360, to determine the most probable time and location for intercell handoff when the user will exit cell 111 for another cell, such as cell 112 or 113. The bandwidth allocation module 370 is then able to prepare cell tower 121 to hand off the user to the cell tower of the cell the user subsequently enters.

The bandwidth allocation module 370 also manages the bandwidth resources of the cell 111 for the summation of all users within the cell. That is, profile keys are received from the central processing repository 130 for all users within the cell 111. The bandwidth allocation module 370 ensures that the limited bandwidth resources of the cell are allocated in the most efficient manner for all users in the cell as the cell approaches its bandwidth limit.

As the user moves across cell 111, the monitor module 340 continually monitors his or her data usage at the specified location and velocity and compares that data usage with the data usage specified by the current mode of operation. As the data usage or the velocity of the user changes beyond the threshold of applicability of the current mode of operation, the monitor module 340 provides the new data usage to the user information module 330. The user information module 330 then generates new user information 280 including the new data usage 284 as well as the user identification information 281, the user's current location 282 in the cell, and the user's current velocity 283.

The new user information 280 is then sent to the central processing repository 130, where it is used to update the profile usage information 230 and used to generate a new profile key 265 and a new profile key 266, if applicable. The new profile keys are then sent to the cell tower 121, where they are used by the bandwidth allocation module 370 to adjust its bandwidth allocations to the new mode of operation of the user. In this way, the cell tower is able to continuously make accurate predictions about the bandwidth resources of the users who move through the cell and allocate the limited bandwidth resources in an efficient manner.

Figure 4:
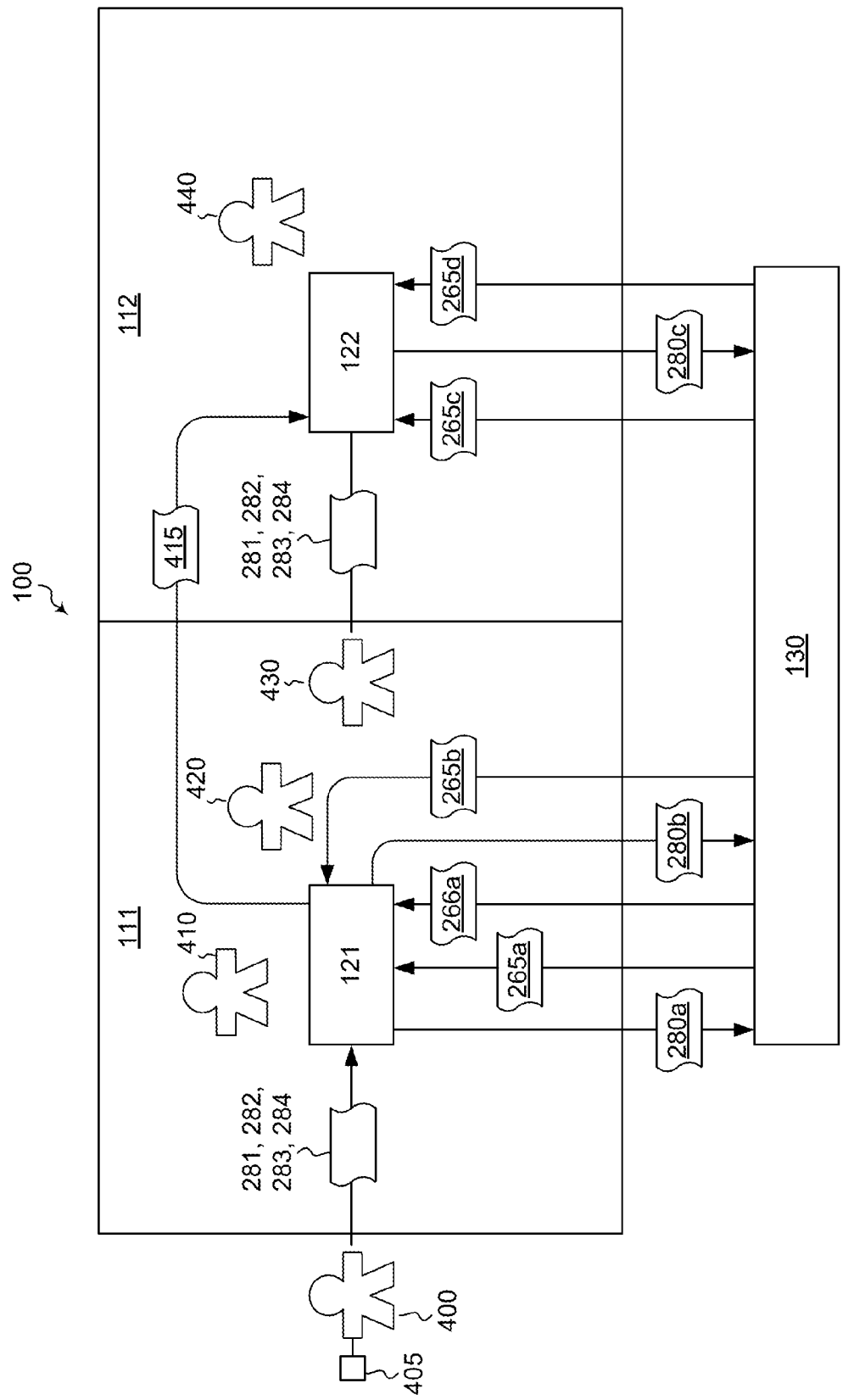
FIG. 4 is an illustrative embodiment of a process flow between a central processing repository and a cell tower of FIG. 1.

FIG. 4 illustrates the flow of a user 400 across the cells 111 and 112 at a time when the usage profile information 230 has already been established. The user 400 access a cellular phone 405. Upon entering the cell 111 at location 401, the cell tower 121 accesses or receives the user identification information 281, the current location 282, the velocity 283 of the user, and the current data usage 284.

The cell tower 121 generates user information 280a that includes the user identification information 281, the current location 282, the velocity 283 of the user, and the current data usage 284, and provides this information to the central processing repository 130. As previously described, the central processing repository 130 uses the user information 280a when accessing the usage profile information 230 to determine the historical usage patterns for the user 400. Based on the profile usage data of the user 400, the central processing repository 130 determines a current mode of operation for the user 400. A data usage tier and user classification may also be determined. In addition, the central processing repository 130 uses statistical analysis to determine, given the location and velocity of the user 400, the probability that the mode of operation will change and the probable next mode of operation. A profile key 265a that includes this information is then generated and provided to the cell tower 121.

The cell tower 121 uses the information provided by the profile key 265a to determine the current mode of operation of the user 400 and then to allocate bandwidth resources as needed. The cell tower 121 approximates the likely location of the user 400 in the cell 111 given the current velocity and the data usage needs of the user 400 if the current mode of operation is maintained. The cell tower 121 also approximates the likely location of the user 400 in the cell and the data usage needs of the user 400 if the current mode of operation changes.

As shown in FIG. 4, the user 400 moves across cell 111 toward a location 410. Based on the usage profile information and the velocity of the user 400, the central computing repository is able to predict that location 410 corresponds to a specific user event, such as the user typically sending an email message at the location 410, which may cause the current mode of operation to change. Based on this, the central processing repository 130 sends a secondary profile key 266a that includes information about the user specific event and the probable mode change. The cell tower 121 receives the secondary key 266a and updates its bandwidth allocation and bandwidth use predictions accordingly.

As previously discussed, the cell tower 121 continuously monitors the data usage of the user 400. At a location 420 in the cell 111, the cell tower determines that the user 400 has exceeded the data usage of the current mode of operation or that his or her velocity has changed. In response, the cell tower 121 generates new user information 280b that includes the new data usage 284 or the new velocity 283 as well as the location 282 and the user identification information 281. The user information 280b is provided to the central processing repository 130.

The central processing repository 130 uses the user information 280b when accessing the usage profile information 230 to determine a new current mode of operation for the user 400. A data usage tier and user classification may also be determined. In addition, the central processing repository 130 uses statistical analysis to determine, given the new location and velocity of the user 400, a new probability that the mode of operation will change and the probable next mode of operation. A profile key 265b that includes this information is then generated and provided to the cell tower 121.

The cell tower 121 uses the information provided by the profile key 265b to determine the new current mode of operation of the user 400 and then to reallocate bandwidth resources as a result of the new mode of operation. The cell tower 121 approximates the likely location of the user 400 in the cell 111 given the current velocity and the data usage needs of the user 400 if the current mode of operation is maintained. The cell tower 121 also approximates the likely location of the user 400 in the cell and the data usage needs of the user 400 if the user 400 if the current mode of operation changes.

At a location 430, the user 400 is ready to leave the cell 111 and enter the cell 112. In one embodiment, the cell tower 121 provides the current mode of operation information as well as user information 280 to the cell tower 122 as illustrated at 415 during an inter cell handoff.

In an alternative embodiment, the cell tower 122 does not receive any information from the cell tower 121. Rather, the cell tower 122 receives or accesses the user identification information 281, current location 282, current velocity 283, and current data usage 284 of the user 400 as the user 400 enters the cell.

Regardless of whether the cell tower 122 receives information from the cell tower 121 or from the user 400, the cell tower 122 generates user information 280c and provides it to the central processing repository 130, where it is used to generate a profile key 265c as previously described. The cell tower 122 may use the profile key 265c to allocate bandwidth resources as explained.

As the user 400 moves across cell 112 to a location 440, the user encounters a geographic hotspot. The central processing repository 130 may provide an updated profile key 265d that includes information regarding the geographic hotspot along with the other information in a profile key previously discussed. The cell tower 122 may use the updated profile key 265d to update the expected bandwidth needs of the user 400 because of the expected change due to the geographic hotspot.

Reference is again made to FIG. 1. In one illustrative embodiment, the user 400 may live in a first city that includes cellular network 110. Accordingly, the central processing repository 130 would include usage profile information 230 about the user. The usage profile information 230 can be used by central processing repository 130 to determine modes of operation as explained.

However, suppose that the user travelled to a second city that implemented the second cellular network 140 and that the user had never before been in the second city. Thus, the second central processing repository 160 would not have any usage profile information about the user. In such embodiment, the second central processing repository 160 could use regional average usage information for the user as explained. However, since the central processing repository 130 and the second central processing repository 160 are in communication with one another, the central processing repository 130 can send the usage profile information 230 for the user. The second central processing repository 160 can then use the usage profile information 230 to help determine modes of operation for the user. In this way, separate cellular networks are able to create and share usage profile information about users who access the networks.

FIG. 5 is a flow diagram of an illustrative embodiment of a method 500 for determining data requirements for cellular phone use in a cell of a cellular network. In the illustrated embodiment, the method 500, and other methods and processes described herein, set forth various functional blocks or actions that may be described as processing steps, functional operations, events and/or acts, etc., which may be performed by hardware, software, and/or firmware. The method 500 includes operations as illustrated by blocks 502, 504, 506, and/or 508.

In block 502, user information identifying a cellular phone user within a cell of a cellular network is received. For example, in one illustrative embodiment the central processing repository 130 may receive the user information 280 from the cell tower 111 as previously described. The user information 280 may include user identification information 281, a user location 282, a user velocity 283, and a current data usage 284.

In block 504, usage profile information that specifies historical data usage within a cell for a given location and time is accessed. For example, in one illustrative embodiment the central processing repository 130 accesses the usage profile information 230. As described, the usage profile information 230 includes historical information regarding modes of operation for the user.

In block 506, a current mode of operation for the cellular phone and a probability that the current mode operation will change are determined. For example, in one illustrative embodiment the statistical module 270 performs statistical analysis on the usage profile information 230 corresponding to the user identified in the user information 280. The statistical analysis allows the central processing repository to determine the current mode of operation for the user and the probability of when the current mode of operation will change.

In block 508, the current mode of operation and the probability that the current mode of operation will change are provided to a cell tower. For example, in one illustrative embodiment, a profile key 265 that includes the current mode of operation and the probability that the current mode of operation will change are provided to a cell tower 121. The cell tower 121 may then use the information provided in the profile key 265 to manage the bandwidth of the cell.

Figure 6:
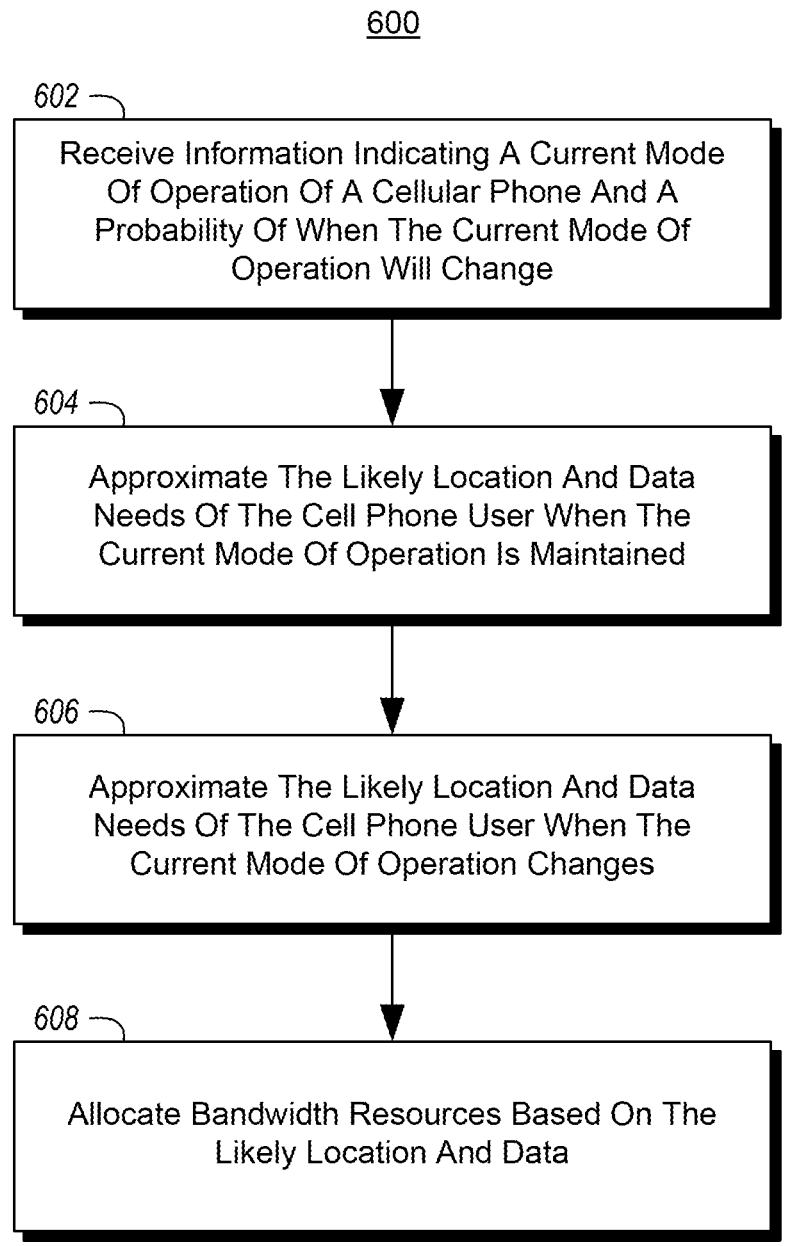
FIG. 6 is a flow diagram of an illustrative embodiment of a method for a cell tower of a cellular network to manage bandwidth resources in a cell of the cellular network

FIG. 6 is a flow diagram of an illustrative embodiment of a method 600 for a cell tower of a cellular network to manage bandwidth resources in a cell of the cellular network. In the illustrated embodiment, the method 600, and other methods and processes described herein, set forth various functional blocks or actions that may be described as processing steps, functional operations, events and/or acts, etc., which may be performed by hardware, software, and/or firmware. The method 600 includes one or more operations as illustrated by blocks 602, 604, 606, and/or 608.

In block 602, information indicating a current mode of operation of a cellular phone and a probability that the current mode of operation will change is received from a central processing repository. For example, in one illustrative embodiment, a profile key 265 that includes the current mode of operation and the probability that the current mode of operation will change for a cellular phone is received by the cell tower 121.

In block 604, the likely location and data needs of the cellular phone user when the current mode of operation is maintained are approximated. For example, in one illustrative embodiment the bandwidth allocation module 370 uses the information provided in the profile key 265 and the information in the modes of operational mode table 360 to approximate the location and data usage needs of the cellular phone user.

In block 606, the likely location and data needs of the cellular phone user when the current mode of operation changes are approximated. For example, in one illustrative embodiment the bandwidth allocation module 370 uses the information provided in the profile key 265 and the information in the modes of operational mode table 360 to approximate the location and data usage needs of the cellular phone user based on the probable next mode of operation.

In block 608, the bandwidth resources based on the likely location and data usage are allocated. For example, in one illustrative embodiment the bandwidth allocation module 370 uses the approximations determined in boxes 604 and 606 to allocate the bandwidth resources of the cell 111 as previously described.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Figure 7:
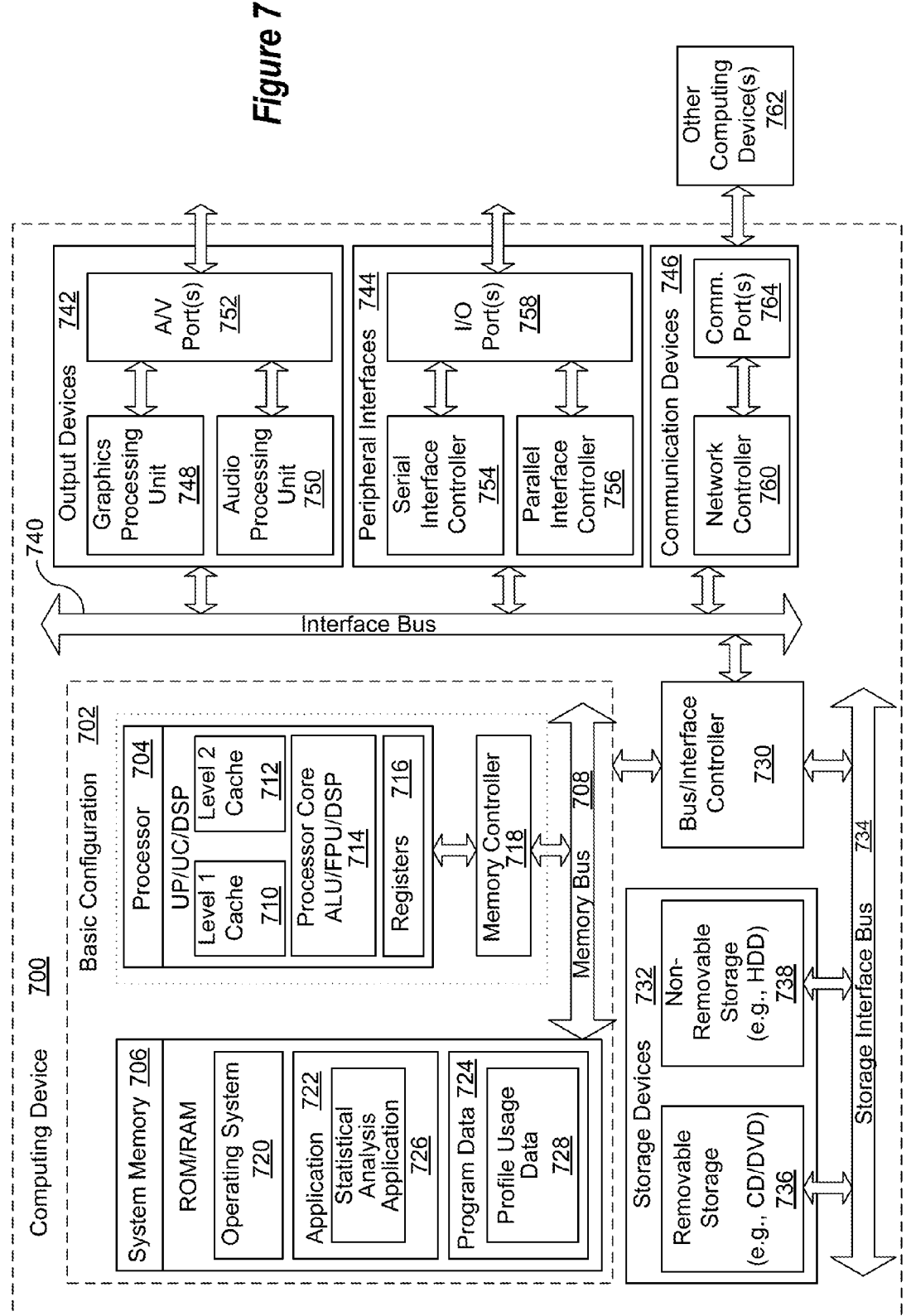
FIG. 7 shows an example computing device that is capable of performing statistical predictions of bandwidth usage in a cell of a cellular network in accordance with the present disclosure.

FIG. 7 shows an example computing device 700 that is arranged for performing image analysis of image data using a repeating geometric sequence in accordance with the present disclosure. In a very basic configuration 702, computing device 700 generally includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include a statistical analysis application 726 that is arranged to perform the functions as described herein including those described with respect to method 500 of FIG. 5. Program Data 724 may profile usage data that may be useful for performing the method described herein. In some embodiments, application 722 may be arranged to operate with program data 724 on operating system 720 such that the work performed by untrusted computing nodes can be verified as described herein. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cellular phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-7 cells refers to groups having 1, 2, 3, 4, or 7 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. In a communications system including one or more cells of a cellular network and a central processing repository communicatively coupled to the one or more cells, a method for the central processing repository to determine data requirements for cellular phone use within the one or more cells, the method comprising:

receiving from at least one cell of a cellular network user information identifying a cellular phone user within the at least one cell;

accessing at the central processing repository usage profile information that specifies historical data usage within the at least one cell for a given location and time including an amount of data used within the at least one cell for the given location and time;

determining, based on the usage profile information, a current mode of operation for the cellular phone user and a probability that the current mode of operation will change, the current mode of operation specifying an expected amount of data usage of the cellular phone user; and providing the current mode of operation and probability that the current mode of operation will change to a cell tower of the at least one cell, the cell tower being configured to use the current mode of operation and the probability to determine current and predicted future bandwidth needs of the user while in the at least one cell for managing a bandwidth of the at least one cell.

2. The method of claim 1, further comprising:
continually updating the usage profile information any time the user information changes or any time the current mode of operation changes.

3. The method of claim 2, further comprising:
determining a new current mode of operation and new probability that the current mode of operation will change based on the updated usage profile information, and providing the new current mode of operation and new probability that the current mode of operation will change to the cell tower.

4. The method of claim 1, wherein the user information includes cellular phone user identification, cellular phone user location upon entering the at least one cell, and cellular phone user velocity upon entering the at least one cell.

5. The method of claim 1, wherein the usage profile information includes geographical hotspots within the at least one cell where it is determined that the cellular phone user is likely to change from the current mode of operation.

6. The method of claim 1, wherein the usage profile information includes a regional average of the data usage of past cellular phone users for a given time and location within the at least one cell.

7. The method of claim 1, wherein the usage profile information includes a usage profile for each cellular phone user of the at least one cell, the usage profile including one or more classifications that indicate the type of the cellular phone user and wherein the classifications are related to the modes of operation which include the current mode of operation.

8. The method of claim 7, wherein the one or more classifications include streamer, heavy, medium, average, light, voice, and emergency and wherein the modes of operation are one of background, intermittent, navigation, burst, and streaming.

9. The method of claim 7, wherein the usage profile includes user specific events and wherein the central processing repository provides the user specific events to the cell tower as part of a secondary key, the user specific events including the cellular phone user following a particular route at a particular time on each of a plurality of days.

10. The method of claim 7, wherein the usage profile includes a probable subsequent mode of operation, which is provided to the cell tower.

11. A cellular network comprising:
a cell including at least one cell tower; and
a central processing repository computing system communicatively coupled to the cell tower, the central processing repository computing system including:

a database having stored thereon usage profile information that specifies historical data usage within the cell for a given geographical location and time, the historical data usage including an amount of data used within the cell for the given geographical location and time; and a processor configured to use the usage profile information to determine a current mode of operation for a cellular phone user and a probability that the current mode of operation will change and to provide the current mode of operation and the probability to the cell tower to determine current and predicted future bandwidth needs for the cellular phone user while in the cell for use in managing predicted bandwidth resource needs based on the current mode of operation and the probability; and wherein the current mode of operation specifies an expected amount of data usage of the cellular phone user.

12. The cellular network of claim 11, wherein the central processing repository computing system is configured to continuously update the usage profile information any time the current mode of operation changes.

13. The cellular network of claim 11, wherein the current mode of operation and probability of change are determined by performing the following:

receiving user information identifying a cellular phone user within the cell from the cell tower;

accessing the usage profile information; and determining, based on the usage profile information, the current mode of operation for the cellular phone user and the probability that the current mode of operation will change.

14. The cellular network of claim 11, wherein the cell tower is configured to perform the following:

receive user information identifying a cellular phone user within the cell when the cellular phone user first enters the cell;

provide the user information to the central processing repository computing system; and use the current mode of operation and the probability to manage predicted bandwidth resource needs of the cellular phone user.

15. The cellular network of claim 11, further comprising a second cell including at least a second cell tower that is communicatively coupled to the central processing repository computing system, wherein:

the central processing computing repository system is configured to:

receive user information identifying a cellular phone user within the second cell from the second cell tower;

access the usage profile information;

determine, based on the usage profile information, a current mode of operation for the cellular phone user of the second cell and a probability that the current mode of operation of the cellular phone user of the second cell will change; and provide to the second cell tower the current mode of operation for the cellular phone user of the second cell and the probability that the current mode of operation of the cellular phone user of the second cell will change; and the second cell tower is configured to:
　receive the user information identifying the cellular phone user of the second cell when the cellular phone user first enters the second cell;
　provide the user information identifying the cellular phone user of the second cell to the central processing repository computing system; and
　use the current mode of operation for the cellular phone user of the second cell and the probability that the current mode of operation of the cellular phone user of the second cell will change to manage predicted bandwidth resource needs of the cellular phone user of the second cell.

16. The cellular network of claim 11, wherein the cellular network further includes a second cell including a second cell tower communicatively coupled to the central processing repository computing system, wherein, when the cellular phone user is handed from the cell to the second cell, the cellular tower is configured to provide the second cellular tower with the current mode of operation of the cellular phone user as the cellular phone user leaves the cell for the second cell.

17. The cellular network of claim 16, wherein the user information is recalculated by the second cell tower upon the cellular phone user entering the second cell and wherein the central processing repository computing system uses the recalculated user information to determine a new current mode of operation and to provide the new current mode of operation to the second cell tower.

18. The cellular network of claim 11, wherein the usage profile information includes a usage profile for each cellular phone user of the cell, the usage profile including one or more classifications that indicate the type of the cellular phone user and wherein the classifications are related to modes of operation which include the current mode of operation.

19. In a communications system including one or more cells of a cellular network and a central processing repository communicatively coupled to the one or more cells, a method for a cell tower of a cell of the one or more cells to manage bandwidth resources for cellular phone users in the cell, the method comprising:
　determining user information of a cellular phone user when the cellular phone user first enters the cell;
　providing the user information to the central processing repository for use by the central processing repository in determining a current mode of operation of the cellular phone user and a probability that the current mode of operation will change to a second mode of operation, the determination of the current mode of operation and the probability that the current mode of operation will change being based on usage profile information that specifies historical data usage of the cellular phone user within the cell for a given location and time, the historical data usage including an amount of data used within the cell for the given location and time;
　receiving information from the central processing repository indicating the current mode of operation and the probability that the current mode of operation will change, the current mode of operation specifying an expected amount of data usage of the cellular phone user;
　approximating by the cell tower the location and data usage needs of the cellular phone user associated only with maintaining the current mode of operation;
　approximating by the cell tower the location and data usage needs of the cellular phone user associated only with changing the current mode of operation; and
　allocating bandwidth resources based on the approximated location and data usage needs of the cellular phone user, including allocating a communication channel and beam and ensuring that an antenna of the cell tower is oriented in an efficient manner all based on the approximated location and data usage needs of the cellular phone user.

20. The method of claim 19, further comprising providing the current mode of operation of the cellular phone user and the probability that the current mode of operation will change to a cell tower of a second cell when the cellular phone user leaves the cell and enters the second cell.

21. A non-transitory computer-readable medium having computer instructions stored thereon that are executable by a computing device to perform operations in a communication system including one or more cells of a cellular network and a central processing repository, the operations comprising:
　receiving from at least one cell of a cellular network user information identifying a cellular phone user within the at least one cell;
　accessing at the central processing repository usage profile information that specifies historical data usage within the at least one cell for a given location and time including an amount of data used within the at least one cell for the given location and time;
　determining, based on the usage profile information, a current mode of operation for the cellular phone user and a probability that the current mode of operation will change, the current mode of operation specifying an expected amount of data usage of the cellular phone user; and
　providing the current mode of operation and probability that the current mode of operation will change to a cell tower of the at least one cell, the cell tower being configured to use the current mode of operation and the probability to determine current and predicted future bandwidth needs of the user while in the at least one cell for managing a bandwidth of the at least one cell.

22. The non-transitory computer-readable medium of claim 21, the operations further comprising:
　continually updating the usage profile information any time the user information changes or any time the current mode of operation changes.

23. The non-transitory computer-readable medium of claim 22, the operations further comprising:
　determining a new current mode of operation and new probability that the current mode of operation will change based on the updated usage profile information, and
　providing the new current mode of operation and new probability that the current mode of operation will change to the cell tower.

24. The non-transitory computer-readable medium of claim 21, wherein the user information includes cellular phone user identification, cellular phone user location upon entering the at least one cell, and cellular phone user velocity upon entering the at least one cell.

25. The non-transitory computer-readable medium of claim 21, wherein the usage profile information includes geographical hotspots within the at least one cell where it is determined that the cellular phone user is likely to change from the current mode of operation.

26. The non-transitory computer-readable medium of claim 21, wherein the usage profile information includes a regional average of the data usage of past cellular phone users for a given time and location within the at least one cell.

27. The non-transitory computer-readable medium of claim 21, wherein the usage profile information includes a usage profile for each cellular phone user of the at least one cell, the usage profile including one or more classifications that indicate the type of the cellular phone user and wherein the classifications are related to the modes of operation which include the current mode of operation.

28. The non-transitory computer-readable medium of claim 27, wherein the one or more classifications include streamer, heavy, medium, average, light, voice, and emergency and wherein the modes of operation are one of background, intermittent, navigation, burst, and streaming.

29. The non-transitory computer-readable medium of claim 27, wherein the usage profile includes user specific events and wherein the central processing repository provides the user specific events to the cell tower as part of a secondary key, the user specific events including the cellular phone user following a particular route at a particular time on each of a plurality of days.

30. The non-transitory computer-readable medium of claim 27, wherein the usage profile includes a probable subsequent mode of operation, which is provided to the cell tower.

31. A non-transitory computer-readable medium having computer instructions stored thereon that are executable by a processing device to perform operations in a communications system including one or more cells of a cellular network and a central processing repository communicatively coupled to the one or more cells, the operations comprising:
   determining user information of a cellular phone user when the cellular phone user first enters the cell;
   providing the user information to the central processing repository for use by the central processing repository in determining a current mode of operation of the cellular phone user and a probability that the current mode of operation will change to a second mode of operation, the determination of the current mode of operation and the probability that the current mode of operation will change being based on usage profile information that specifies historical data usage of the cellular phone user within the cell for a given location and time, the historical data usage including an amount of data used within the cell for the give location and time;
   receiving information from the central processing repository indicating the current mode of operation and the probability that the current mode of operation will change, the current mode of operation specifying an expected amount of data usage of the cellular phone user;
   approximating by the cell tower the location and data usage needs of the cellular phone user associated only with maintaining the current mode of operation;
   approximating by the cell tower the location and data usage needs of the cellular phone user associated only with changing the current mode of operation; and
   allocating bandwidth resources based on the approximated location and data usage needs of the cellular phone user, including allocating a communication channel and beam and ensuring that an antenna of the cell tower is oriented in an efficient manner all based on the approximated location and data usage needs of the cellular phone user.

32. The non-transitory computer-readable medium of claim 31, the operations further comprising providing the current mode of operation of the cellular phone user and the probability that the current mode of operation will change to a cell tower of a second cell when the cellular phone user leaves the cell and enters the second cell.

\* \* \* \* \*